(12) United States Patent
Nakada et al.

(10) Patent No.: US 8,064,150 B2
(45) Date of Patent: Nov. 22, 2011

(54) LENS BARREL AND IMAGING DEVICE

(75) Inventors: Toshiyuki Nakada, Osaka (JP); Hideaki Kawane, Osaka (JP); Hiroyasu Fujinaka, Osaka (JP); Itaru Enguchi, Nara (JP)

(73) Assignee: Panasonic Corporation, Osaka (JP)

( * ) Notice: Subject to any disclaimer, the term of this patent is extended or adjusted under 35 U.S.C. 154(b) by 554 days.

(21) Appl. No.: 12/163,559

(22) Filed: Jun. 27, 2008

(65) Prior Publication Data
US 2009/0002847 A1 Jan. 1, 2009

(30) Foreign Application Priority Data
Jun. 28, 2007 (JP) .................................. 2007-169932

(51) Int. Cl.
*G02B 7/02* (2006.01)
(52) U.S. Cl. ..................... 359/819; 359/811; 359/815
(58) Field of Classification Search .................. 359/811, 359/813, 819–824
See application file for complete search history.

(56) References Cited

U.S. PATENT DOCUMENTS

| 6,052,535 | A  | * | 4/2000 | Uno ................................ 396/72 |
| 7,477,454 | B2 |   | 1/2009 | Shinohara et al. |
| 7,660,053 | B2 |   | 2/2010 | Naitou |
| 2004/0027687 | A1 | * | 2/2004 | Bittner et al. ................. 359/694 |

FOREIGN PATENT DOCUMENTS

| JP | 58-111003 | 7/1983 |
| JP | 61-167722 | 7/1986 |
| JP | 6-250068 | 9/1994 |
| JP | 9-152543 | 6/1997 |
| JP | 2003-279827 | 10/2003 |
| JP | 2003-337276 | 11/2003 |
| JP | 2006-259344 | 9/2006 |
| JP | 2009-181000 | 8/2009 |

* cited by examiner

*Primary Examiner* — Scott J Sugarman
*Assistant Examiner* — Brandi Thomas
(74) *Attorney, Agent, or Firm* — McDermott Will & Emery LLP

(57) ABSTRACT

A collapsible lens barrel is provided, including a mechanism capable of reliably inhibiting rotation of a rotational barrel even if any impact is applied thereto, for example, due to a fall with the barrel being extended. When the rotational barrel is pressed upon a fixed member due to impact in defiance of the biasing force of a wave spring, a first engagement portion provided at a camera body-side end of the rotational barrel engages with second engagement portions provided on a subject-side surface of the fixed member, which locks rotation of the rotational barrel, thereby making it possible to prevent gears from being damaged, for example.

17 Claims, 13 Drawing Sheets

LENS BARREL AND IMAGING DEVICE

FIELD OF THE INVENTION

The present invention relates to collapsible lens barrels, and imaging devices having such a lens barrel mounted thereon. The present invention particularly relates to a lens barrel including a mechanism for preventing damage due to drop impact, for example.

BACKGROUND OF THE INVENTION

Widespread use of the digital still camera and the video movie camera that use the solid-state image sensor results in a strong demand for smaller imaging devices. In order to satisfy such a demand for smaller imaging devices and to further improve portability, the so-called "collapsible lens barrel", which retracts into a camera body when performing no image shooting, has been widely used. The length of the collapsible lens barrel is changed by a motor rotating a rotational barrel to move an optical imaging system in the optical axis direction.

As for conventional collapsible lens barrels, if any impact is applied thereto, for example, due to a fall with the barrel being extended, any force acting on cam pins is converted to a force that rotates the rotational barrel, so that the rotational barrel might be rotated. Where only the rotational barrel is rotated with the motor for rotating the rotational barrel being stopped, load is applied to a mechanism used for extension, including gear trains, for example, so that in some cases, gears might be damaged.

There have been proposed some structures for locking rotation of the rotational barrel, for example, in order to prevent the gears from being damaged when any impact is applied to the lens barrel. For example, in Japanese Laid-Open Patent Publication No. 2003-279827, cam grooves are each shaped to have a planar portion perpendicular to the optical axis in such a manner as to cause no force to be generated in the direction of rotating the rotational barrel, thereby inhibiting rotation of the rotational barrel. However, in the case of the structure as described in Japanese Laid-Open Patent Publication No. 2003-279827, the effect of inhibiting the rotation of the rotational barrel is limited, and there are large gaps between the cam grooves and the cam pins, resulting in a problem where image blur might occur.

BRIEF SUMMARY OF THE INVENTION

An object of the present invention is to provide a lens barrel including a mechanism capable of reliably inhibiting rotation of the rotational barrel even if any impact is applied thereto, for example, due to a fall with the barrel being extended.

To attain the above object, the present invention provides a lens barrel mounted on/detachable from an imaging device body, comprising:
a lens;
a rotational barrel including a first contact portion and rotatable about an optical axis of the lens with respect to the imaging device body; and
a fixed member including a second contact portion and unrotatable about the optical axis of the lens with respect to the imaging device body, wherein,
the rotational barrel moves toward the fixed member along the optical axis to bring the first contact portion and the second contact portion into contact with each other, thereby locking rotation of the rotational barrel about the optical axis with respect to the imaging device body.

According to the present invention, even if any impact is applied to the lens barrel, for example, due to a fall with the barrel being extended, the first contact portion provided on the rotational barrel and the second contact portion provided on the fixed member are brought into contact with each other to lock rotation of the rotational barrel. More specifically, the engagement between the first contact portion and the second contact portion, or a frictional force generated therebetween, reliably inhibits the rotational barrel from rotating about its axial center, thereby making it possible to prevent gears from being damaged, for example.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 8 is a side view of the lens barrel 10, illustrating the rotational barrel 160a spaced apart from the fixed member 180a.

FIG. 10 is a side view of the lens barrel 10, illustrating a first engagement portion 166 provided on the rotational barrel 160a engaging with a second engagement portion 184 provided on the fixed member 180a.

DETAILED DESCRIPTION OF THE INVENTION

First Embodiment

Figure 1:
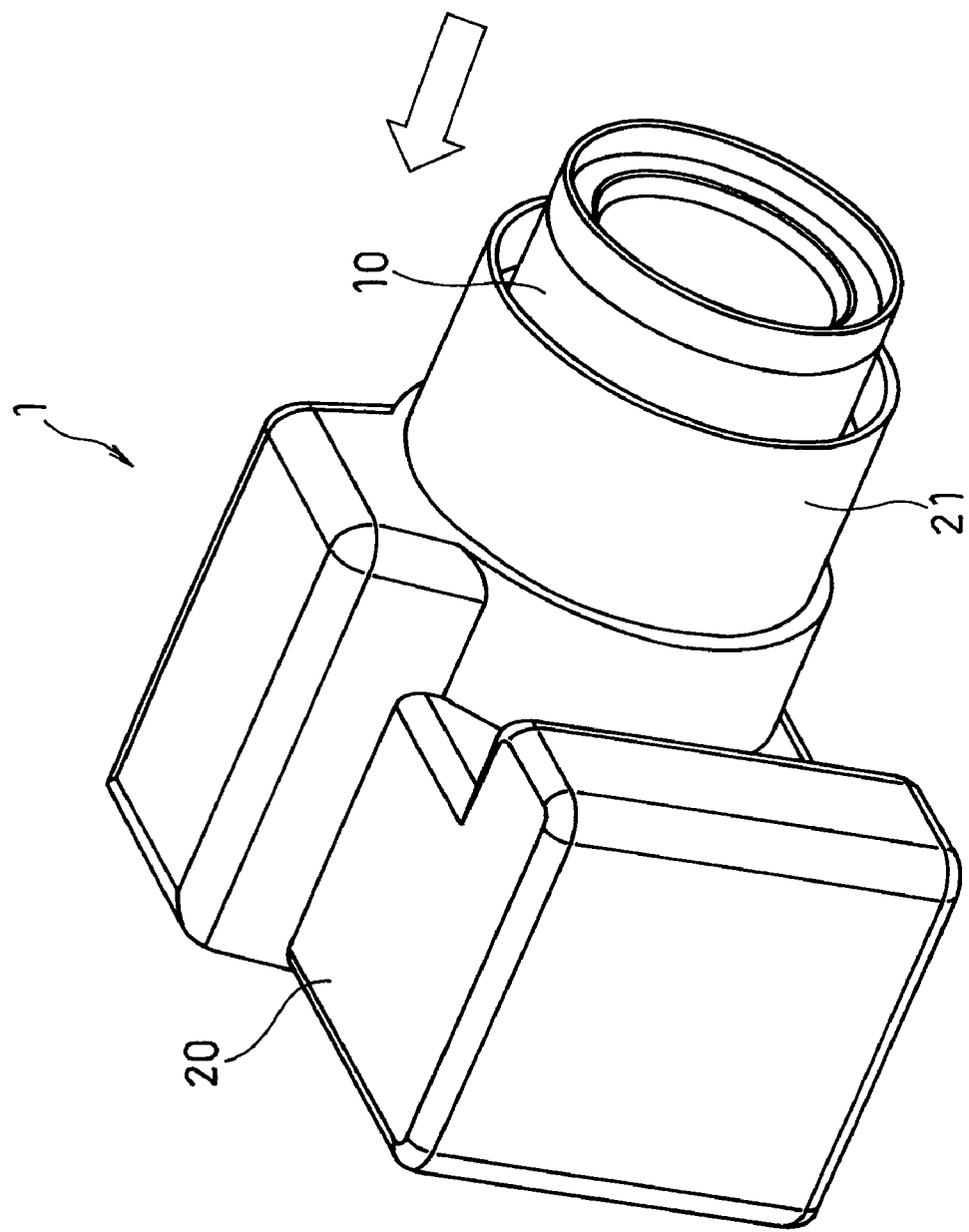
FIG. 1 is a perspective view of a digital still camera including a lens barrel 10 according to a first embodiment of the present invention.

FIG. 1 illustrates the external appearance of a digital still camera (hereinafter, simply referred to as a "camera") 1 including a lens barrel according to a first embodiment of the present invention. The camera 1 includes a camera body 20, and a collapsible lens barrel 10, which is retractable into and extendable from the camera body 20. The camera body 20 includes a barrel storage portion 21 for protecting the lens barrel 10, so that the lens barrel 10 can entirely retract into the barrel storage portion 21.

Figure 2:
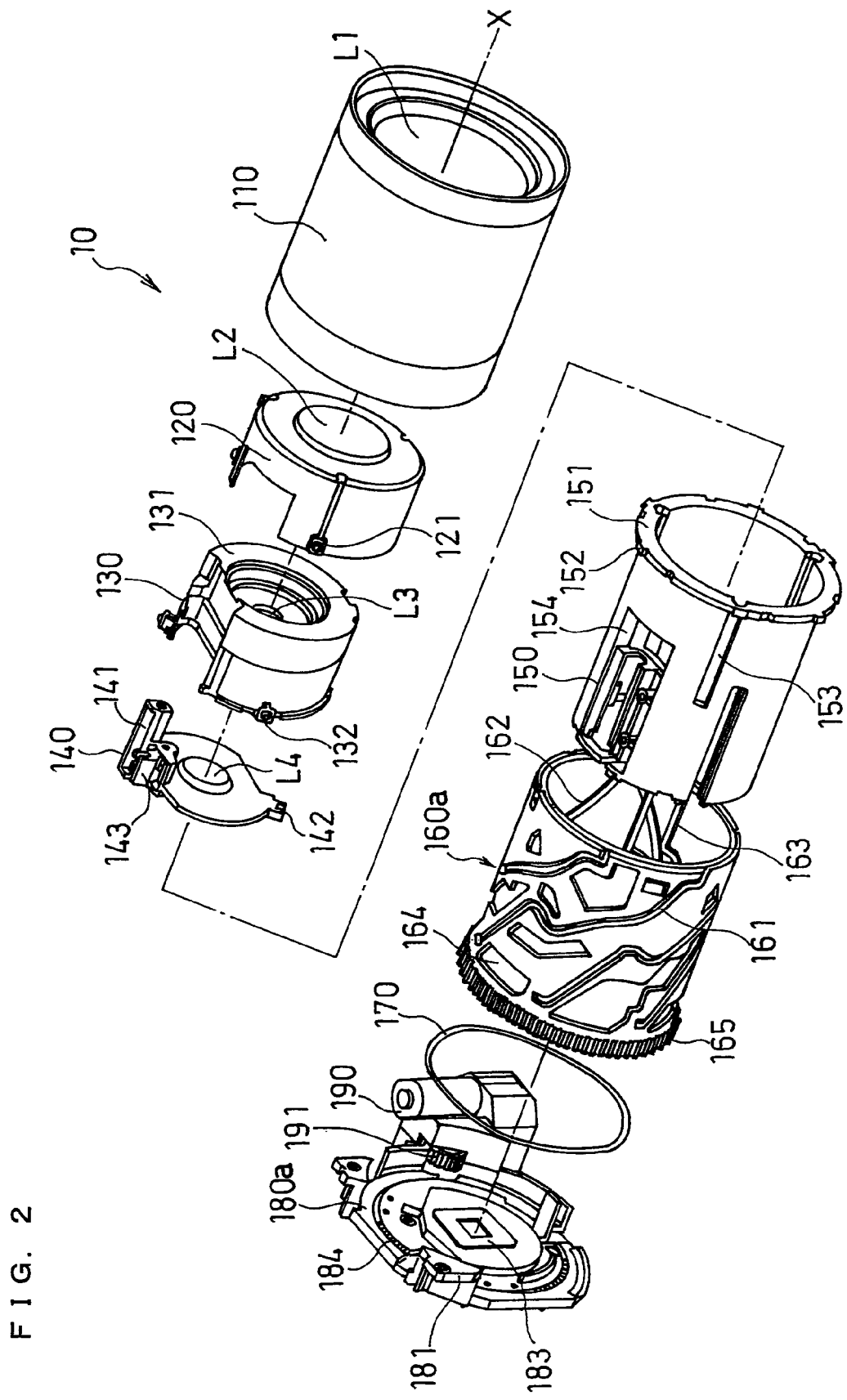
FIG. 2 is an exploded perspective view of the lens barrel 10 according to the first embodiment.

FIG. 2 is an exploded perspective view of the lens barrel 10. The lens barrel 10 includes a first-group lens unit 110, a second-group lens unit 120, a third-group lens unit 130, a fourth-group lens unit 140, a fixed barrel 150, a rotational barrel 160a, a wave spring 170, a fixed member 180a, and a motor unit 190.

Before concretely describing the configuration of the lens barrel 10, the optical imaging system of the lens barrel 10 will be briefly described in terms of its configuration and basic operation. The optical system of the lens barrel 10 consists of a first-group lens L1 held in the first-group lens unit 110, a second-group lens L2 held in the second-group lens unit 120, a third-group lens L3 held in the third-group lens unit 130, and a fourth-group lens L4 held in the fourth-group lens unit 140.

Of the aforementioned lenses, the first-group lens L1, the second-group lens L2, and the third-group lens L3 are zooming lenses that move back and forth in the direction of the optical axis X in accordance with rotation of the rotational barrel 160a, thereby changing the focal length. On the other hand, the fourth-group lens L4 is a focusing lens that moves in the direction of the optical axis X with the aid of a lead screw 155 to be described later (see FIG. 6), thereby forming a subject image on a CCD sensor 183 provided in the fixed member 180a. Note that each of these lenses (the first-through fourth-group lenses L1-L4) consists of a combination of lens elements.

Note that the third-group lens L3 also serves as an image-blur correction lens, and is movable on a plane perpendicular to the optical axis X with the aid of an actuator (not shown) included in the third-group lens unit 130. In addition, a shutter unit 131 is provided on the subject side of the third-group lens unit 130. The shutter unit 131 includes a shutter and an actuator for driving the shutter, and controls the exposure time of the CCD sensor 183. Note that the image-blur correction operation of the third-group lens unit 130 and the operation of the shutter unit 131 are not directly involved with the present invention, and therefore any detailed descriptions thereof will be omitted herein.

Next, the configuration of the lens barrel 10 will be concretely described. The fixed member 180a will be described first. As enlarged in FIG. 3, the fixed member 180a, which is provided in the shape of a flat plate, has three attachment portions 181 to the camera body 20 provided around its edge. The attachment portions 181 each have a hole through which a bolt (not shown) passes to secure the fixed member 180a to the camera body 20.

The fixed member 180a has the CCD sensor 183, which is a solid-state image sensor, provided at its center such that the optical axis X passes therethrough. Note that for ease of handling, the fixed member 180a is provided independently of the camera body 20 and secured to the camera body 20 via the bolts, but it may be integrally formed with the camera body 20.

The fixed member 180a has the motor unit 190 provided at a portion of its edge. The motor unit 190 includes a motor and a plurality of gear trains including a worm gear. The gear trains change the rotational direction of the motor and reduce the rotational speed of the motor, which is transmitted to a gear 191.

Referring again to FIG. 2, the fixed barrel 150 will be described. The fixed barrel 150, which is provided in the shape of a cylinder, is secured to the fixed member 180a via bolts (not shown) with its axial center approximately coinciding with the optical axis X. The fixed barrel 150 has a flange 151 formed at its subject-side end, and six projections 152 formed and equally spaced around the outer circumference of the flange 151. In addition, the fixed barrel 150 has three holes for linear movement 153 formed and equally spaced at a subject-side end of its cylindrical portion in parallel to the optical axis X. Furthermore, the fixed barrel 150 has a recess 154 formed in a portion of its outer circumferential surface in order to store the lead screw 155 and a motor 156 to be described later (see FIG. 6). The lead screw 155 and the motor 156 are secured to the fixed barrel 150 via unillustrated bolts.

Next, the rotational barrel 160a will be described. The fixed barrel 150 has the rotational barrel 160a rotatably disposed around its outer circumference so as to surround the fixed barrel 150, the rotational barrel 160a being provided in the shape of a cylinder having its axial center coinciding with that of the fixed barrel 150. As enlarged in FIG. 4, the rotational barrel 160a has cam grooves 161 formed in its outer circumferential surface, and cam grooves 162 and 163 formed in its inner circumferential surface. Note that the rotational barrel 160a also has irregularly-shaped grooves 164 formed in its outer circumferential surface to reduce the thickness. The grooves 164 are not directly involved with the operation of the lens barrel 160a.

Figure 5:
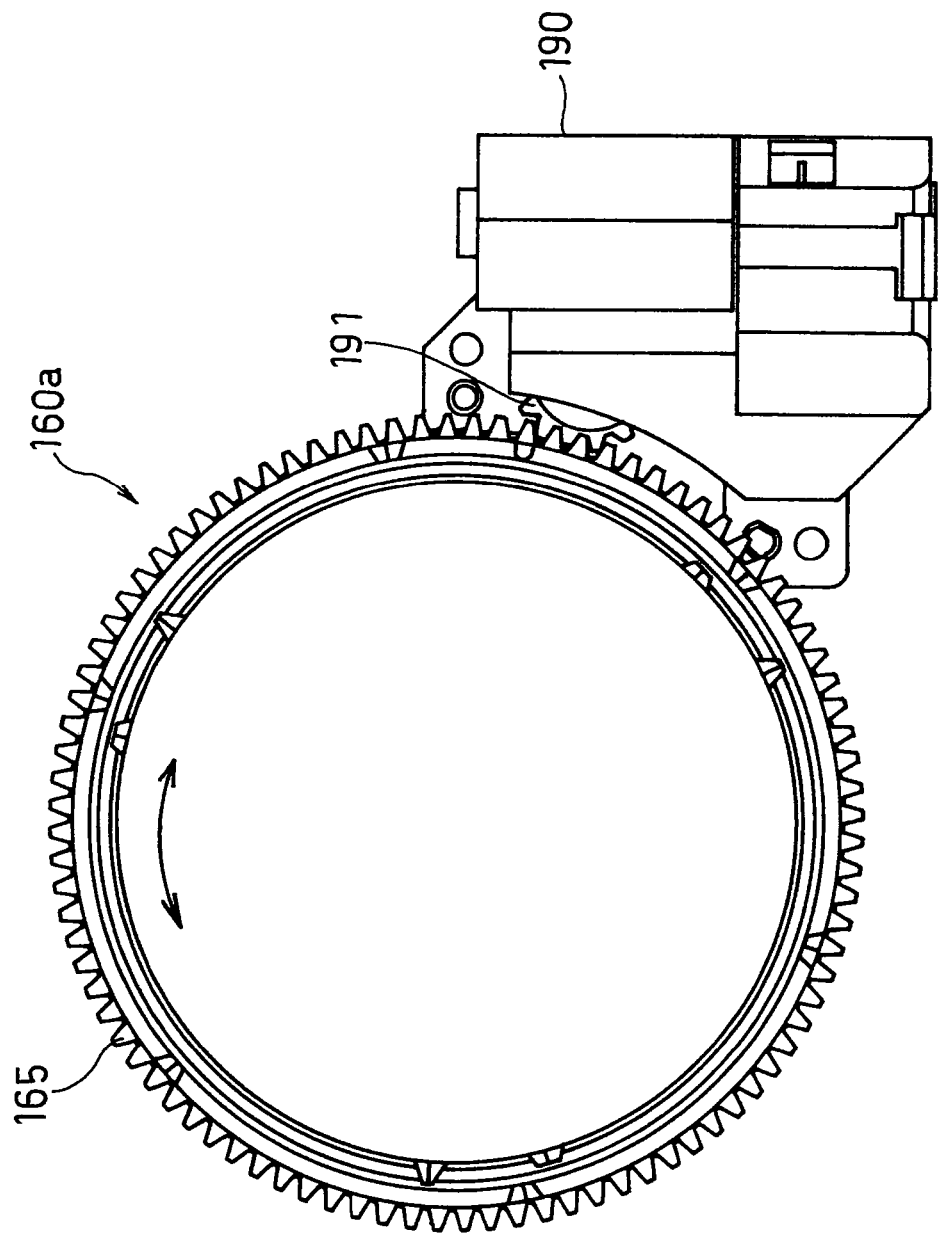
FIG. 5 is a front view illustrating the positional relationship between the rotational barrel 160a and a motor unit 190 in FIG. 2, as viewed from the subject side.

The rotational barrel 160a has a gear 165 formed at the camera body-side end of its outer circumferential surface. FIG. 5 illustrates the positional relationship between the rotational barrel 160a and the motor unit 190. The gear 165 of the rotational barrel 160a meshes with the gear 191 of the motor unit 190. The drive force of the motor unit 190 is transmitted to the rotational barrel 160a via the gears 191 and 165, thereby rotating the rotational barrel 160a in a forward or reverse direction as indicated by an arrow.

Referring again to FIG. 2, the wave spring 170 will be described. The wave spring 170, which is an elastic ring-shaped member, is provided between the fixed member 180a and the rotational barrel 160a so as to have the fixed barrel 150 inserted therethrough. The wave spring 170 is a kind of flat spring, and is formed of a flat metal ring corrugated in several places around its perimeter. The wave spring 170 biases the rotational barrel 160a and the fixed member 180a in such directions as to space them apart from each other. The wave spring 170 presses the rotational barrel 160a upon the camera body-side end surface of the flange 151 on the fixed barrel 150, thereby regulating the position of the rotational barrel 160a in the direction of the optical axis X.

Figure 3:
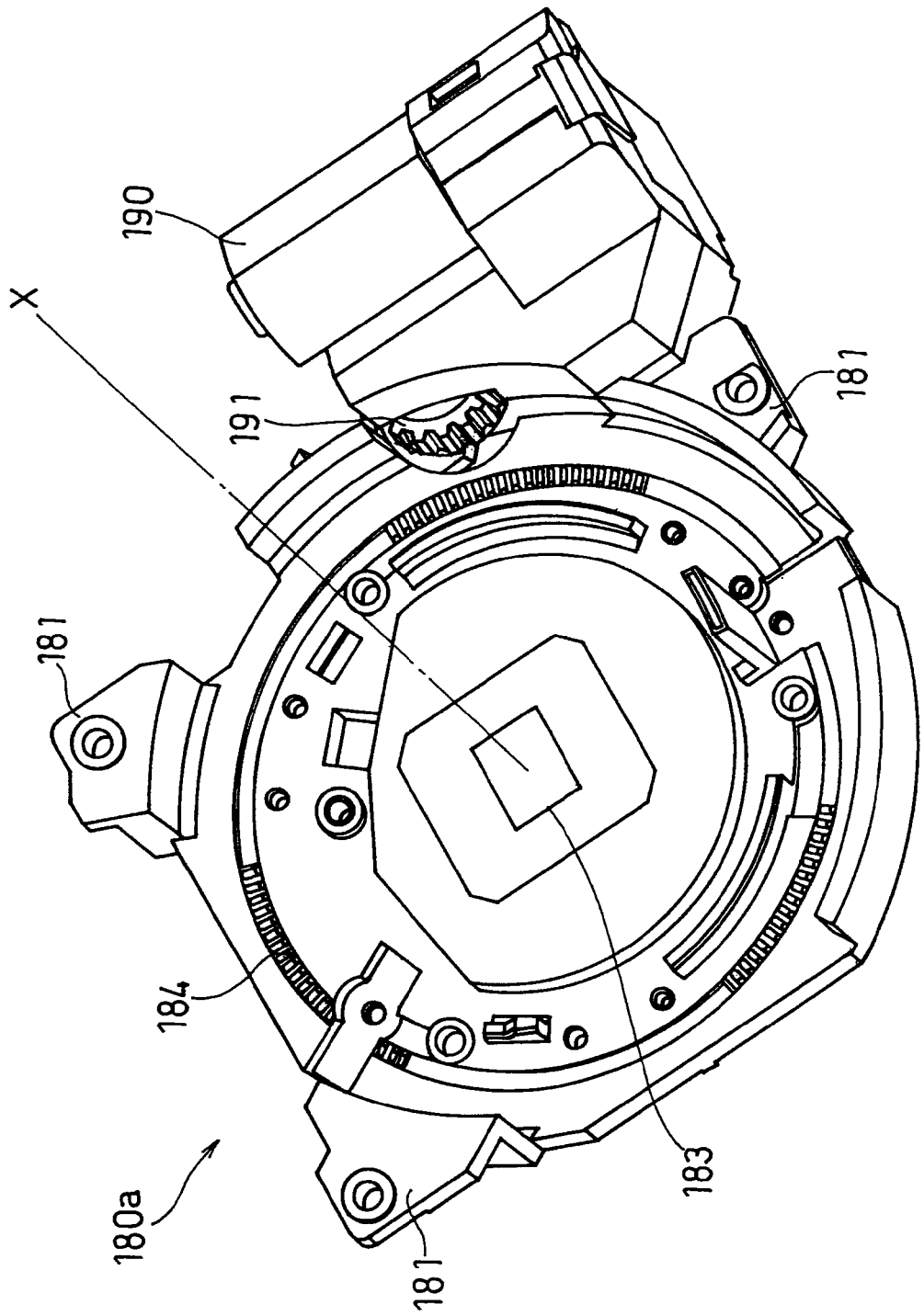
FIG. 3 is a perspective view of a fixed member 180a shown in FIG. 2.
Figure 4:
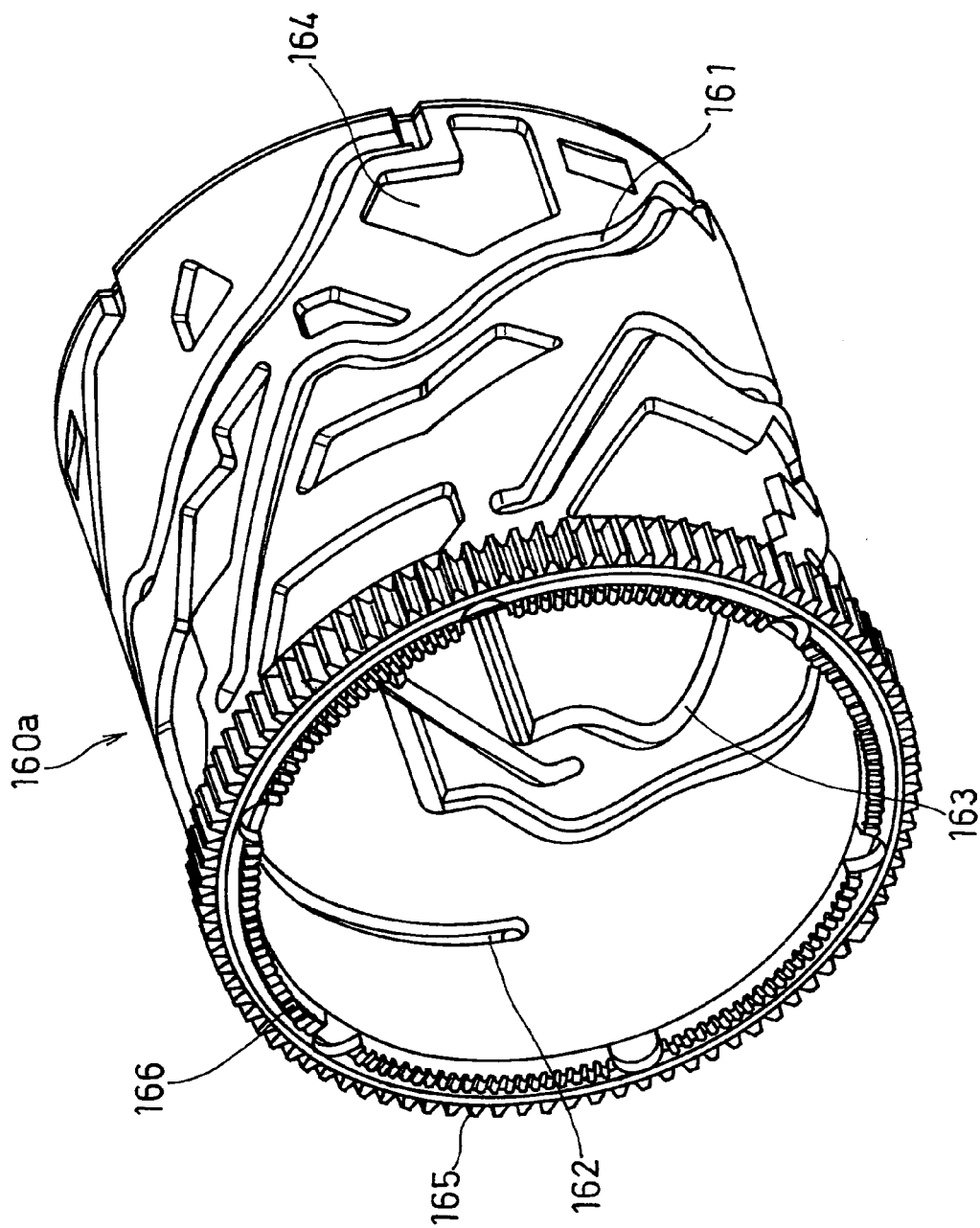
FIG. 4 is a perspective view of a rotational barrel 160a shown in FIG. 2.

As shown in FIG. 4, the rotational barrel 160a has a first engagement portion 166 provided at its camera body-side end. In addition, as shown in FIG. 3, the fixed member 180a has three second engagement portions 184 each provided in the form of an arc and engage with the first engagement portion 166 to lock rotation of the rotational barrel 160a.

The wave spring 170 normally biases the first and second engagement portions 166 and 184 to space them apart for disengagement from each other. When any impact is applied to the lens barrel 10, the first and second engagement portions 166 and 184 are brought into contact to engage with each other, thereby inhibiting rotation of the rotational barrel 160a to prevent the gear 165 and the gear trains in the motor unit 190 from being damaged. Note that the first and second engagement portions 166 and 184 are examples of first and second contact portions, respectively, of the present invention. The functions and the operations of the first and second engagement portions 166 and 184 will be described in detail later with reference to the drawings.

Referring again to FIG. 2, the first-through fourth-group lens units 110 to 140 will be described. The first-group lens unit 110, which is provided in the shape of a cylinder, has the first-group lens L1 held on its subject side. In addition, the first-group lens unit 110 has six straight grooves (not shown) formed on the camera body-side of its inner circumferential surface, the grooves engaging with the projections 152 provided at the end of the fixed barrel 150. The engagement between the straight grooves formed in the inner circumferential surface and the projections 152 of the fixed barrel 150 allows the first-group lens unit 110 to move in the direction of the optical axis X.

In addition, the first-group lens unit 110 has cam pins (not shown) attached to its camera body-side inner circumferential surface end so as to engage with the cam grooves 161 formed in the outer circumferential surface of the rotational barrel 160a. Note that the cam grooves 161 are each formed in a non-linear shape determined in accordance with the movement locus of the first-group lens L1.

When driving the motor of the motor unit 190, its drive force is transmitted to the gear 165 of the rotational barrel 160a, thereby rotating the rotational barrel 160a. Since the cam pins of the first-group lens unit 110 engage with the cam grooves 161 of the rotational barrel 160a, when the rotational barrel 160a is rotated, the first-group lens unit 110 is guided by the projections 152 of the fixed barrel 150, moving in the direction of the optical axis X in accordance with the shape of each cam groove 161.

The second-group lens unit 120, which is provided in the shape of a cylinder, has the second-group lens L2 held on its subject side, and three cam pins 121 attached and equally spaced on the outer circumferential surface. Similarly, three cam pins 132 are attached and equally spaced on the outer circumferential surface of the third-group lens unit 130 provided in the shape of a cylinder and having the third-group lens L3 held therein. The cam pins 121 and 132 each engage with a corresponding set of three holes for linear movement 153 provided in the fixed barrel 150. Accordingly, the second-group lens unit 120 and the third-group lens unit 130 can move in the direction of the optical axis X while being stably supported in the holes for linear movement 153 via the cam pins 121 and 132.

Furthermore, the cam pins 121 and 132 pass through their respective holes for linear movement 153 and engage with the cam grooves 162 and 163, respectively, formed in the inner circumferential surface of the rotational barrel 160a. The cam grooves 162 and 163 are formed in non-linear shapes respectively determined in accordance with the movement loci of the second-group lens L2 and the third-group lens L3.

When driving the motor of the motor unit 190, its drive force is transmitted to the gear 165 of the rotational barrel 160a, thereby rotating the rotational barrel 160a. Since the cam pins 121 of the second-group lens unit 120 and the cam pins 132 of the third-group lens unit 130 engage with their respective cam grooves 162 and 163 of the rotational barrel 160a, when the rotational barrel 160a is rotated, the second-group lens unit 120 and the third-group lens unit 130 are guided by their respective holes for linear movement 153 in the fixed barrel 150, moving along the shapes of the cam grooves 162 and 163, respectively. As a result, the second-group lens unit 120 and the third-group lens unit 130 are operated together to perform a zooming operation in cooperation with the first-group lens unit 110.

The fourth-group lens L4 for focal adjustment is held in the fourth-group lens unit 140 provided in the form of a disk. The fourth-group lens unit 140 includes guide members 141 and 142, the guide member 141 having the first one of two poles (not shown) secured on the fixed member 180a passing therethrough, the guide member 142 nipping the second pole. Furthermore, the fourth-group lens unit 140 has a holding member 143 for holding a rack 157 (see FIG. 6) that converts rotary motion of the lead screw 155 into linear motion. The rack 157 has a plurality of teeth meshing with threads of the lead screw 155, and moves in its axis direction in accordance with rotation of the lead screw 155. As a result, the fourth-group lens unit 140 is guided by the two unillustrated poles, linearly moving along the optical axis X with the aid of rotation of the motor 156 (see FIG. 6) attached in the recess 154 of the fixed barrel 150.

Figure 6:
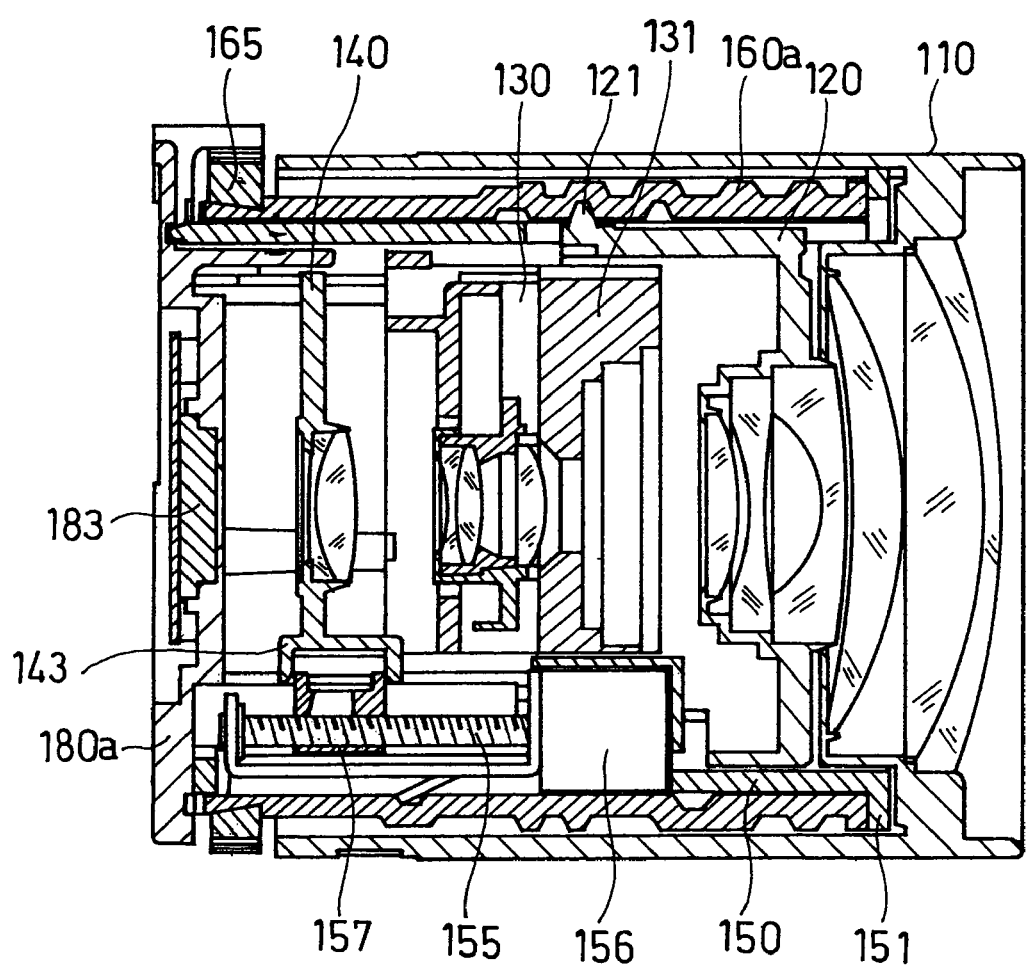
FIG. 6 is a vertical cross-sectional view of the lens barrel 10 when collapsed.
Figure 7:
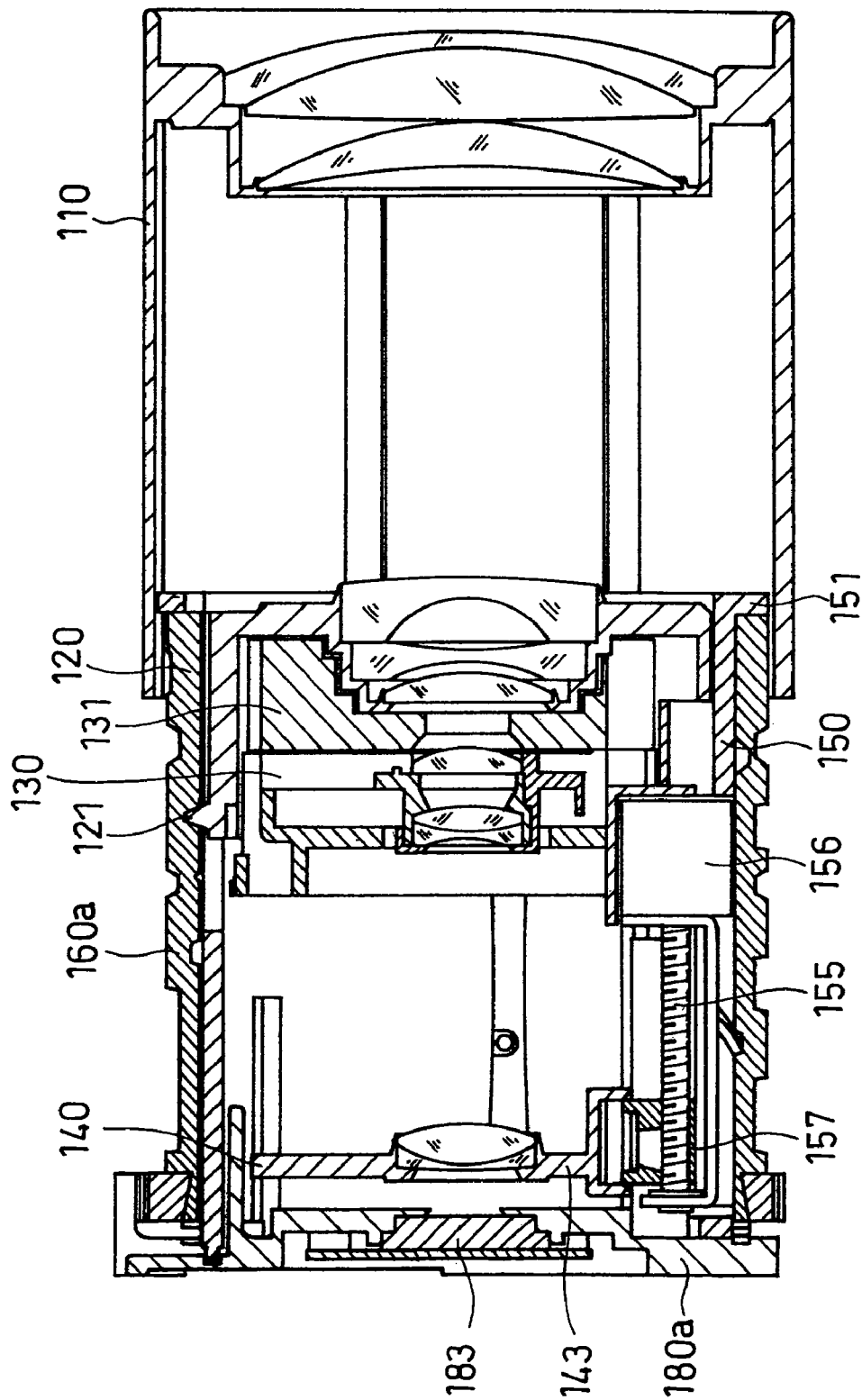
FIG. 7 is a vertical cross-sectional view of the lens barrel 10 when extended for shooting.

Next, referring to cross-sectional views in FIGS. 6 and 7, basic operations of the lens barrel 10, i.e., extending/retracting operations, will be briefly described. FIG. 6 illustrates a cross section of the lens barrel 10 when collapsed, and FIG. 7 illustrates a cross section of the lens barrel 10 when extended for shooting.

Note that the third-group lens unit 130 includes an actuator for moving the third-group lens on a plane perpendicular to the optical axis, and the shutter unit 131 includes a shutter and an actuator for driving the shutter, but these actuators are not directly involved with the present invention, and therefore they are omitted in FIGS. 6 and 7.

When the camera 1 is turned off, the lens barrel 10 is collapsed as shown in FIG. 6. Once the camera 1 is turned on, the motor of the motor unit 190 starts rotating, thereby rotationally driving the rotational barrel 160a (see FIG. 5). The rotation of the rotational barrel 160a moves the first-group lens unit 110, the second-group lens unit 120, and the third-group lens unit 130 toward a subject so that the collapsed lens barrel 10 as shown in FIG. 6 is extended for shooting as shown in FIG. 7. Note that FIG. 7 shows the barrel extended to its maximum extent, i.e., the telephoto end.

In FIG. 7, the position of the fourth-group lens unit 140 is controlled by a focal control signal generated based on a video signal obtained by the CCD sensor 183. Specifically, the focal control signal generated by an unillustrated control circuit controls rotation of the motor 156. The rotation of the motor 156 rotationally drives the lead screw 155, thereby moving the rack 157 and the fourth-group lens unit 140 in the direction of the optical axis X. The fourth-group lens unit 140 stops moving when a focus is found on the CCD sensor 183.

In this manner, when the lens barrel 10 is extended for shooting, the rotational barrel 160a is rotated to move the first-group lens unit 110, the second-group lens unit 120, and the third-group lens unit 130 along their respective cam grooves 161 to 163 in the direction of the optical axis X, thereby performing the zooming operation.

On the other hand, when collapsing the lens barrel 10 extended for shooting, the rotational barrel 160a is rotated in reverse. By rotating the rotational barrel 160a in reverse, the first-group lens unit 110, the second-group lens unit 120, and the third-group lens unit 130 are caused to move toward the camera body. As a result, the rotational barrel 160a retracts into the barrel storage portion 21 (see FIG. 1), so that the lens barrel 10 is shortened compared to during shooting.

Figure 8:
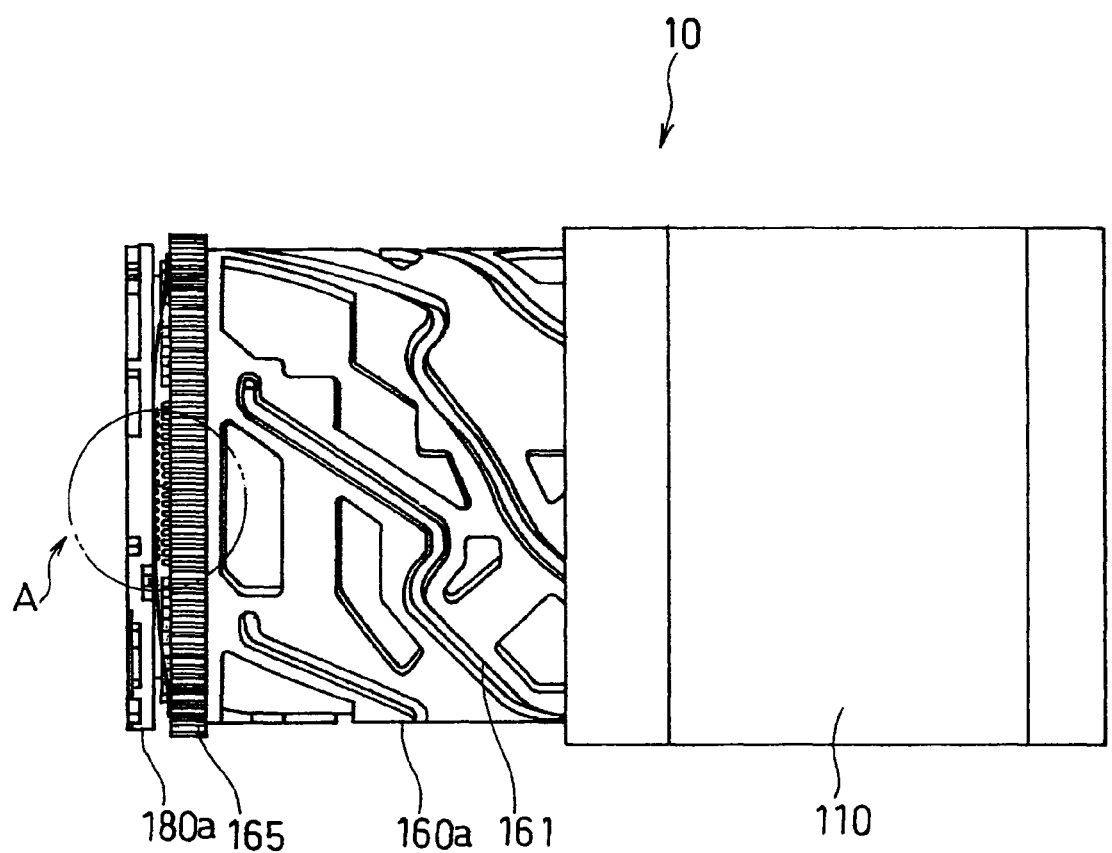
Figure 9:
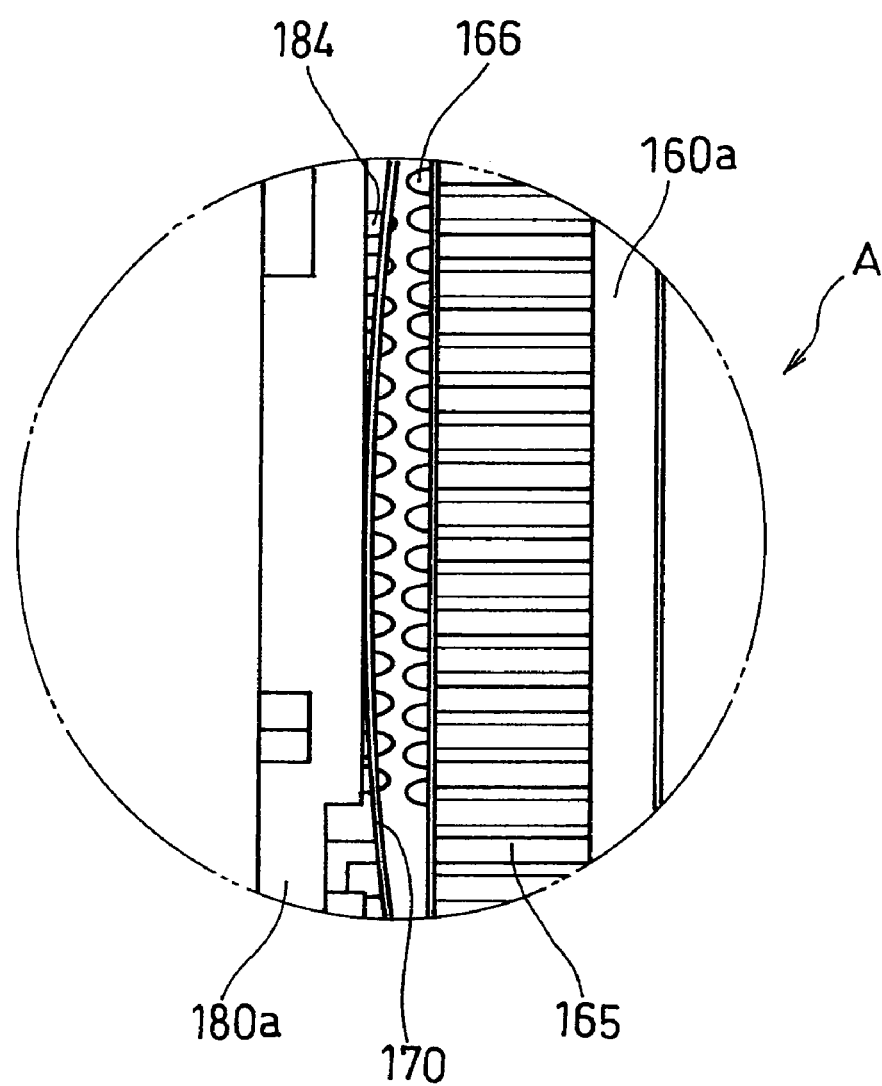
FIG. 9 is a view illustrating in enlargement a portion enclosed by circle "A" in FIG. 8.
Figure 10:
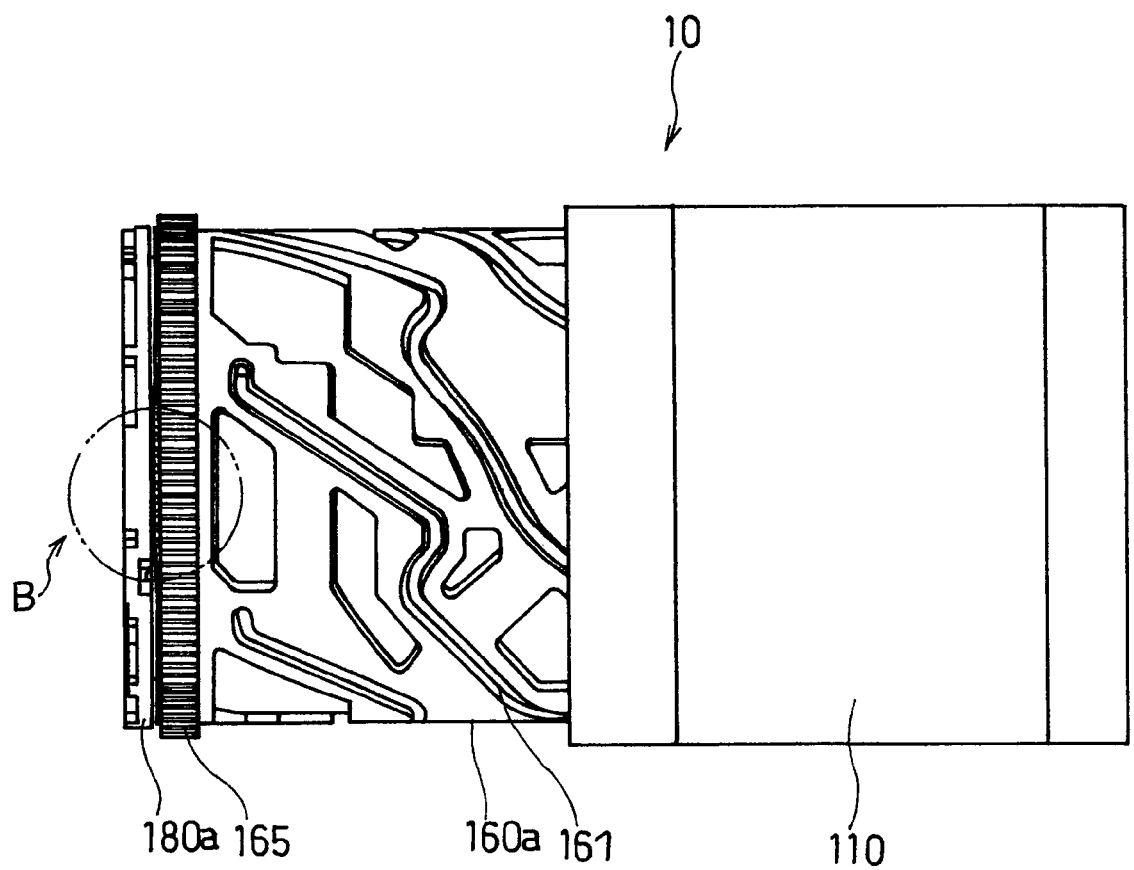
Figure 11:
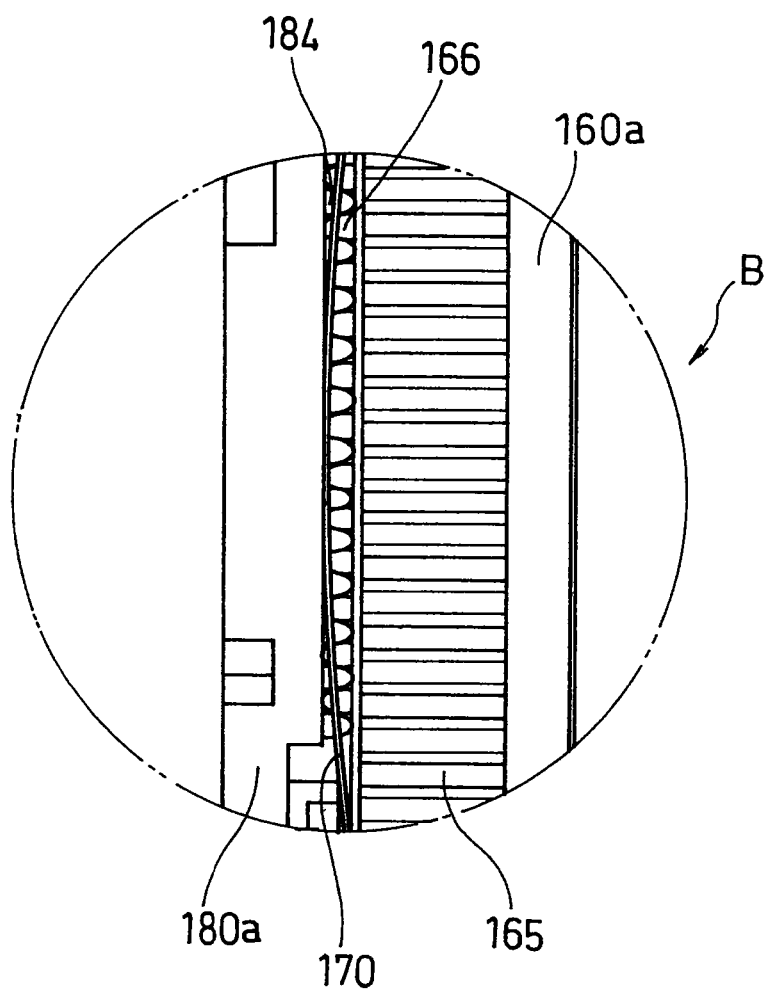
FIG. 11 illustrates in enlargement a portion enclosed by circle "B" in FIG. 10.

Next, referring to FIGS. 8 to 11, the functions of the first and second engagement portions 166 and 184 will be described. FIG. 8 illustrates the rotational barrel 160a spaced apart from the fixed member 180a, and FIG. 9 illustrates in enlargement a portion enclosed by circle "A" in FIG. 8. In addition, FIG. 10 illustrates engagement between the first and second engagement portions 166 and 184 respectively provided on the rotational barrel 160a and the fixed member 180a, and FIG. 11 illustrates in enlargement a portion enclosed by circle "B" in FIG. 10.

The lens barrel 10, when extended from the camera body 20, has at least its tip projecting from the barrel storage portion 21, as shown in FIG. 1. Therefore, if the camera 1 is dropped carelessly, for example, the tip of the lens barrel 10 hits the ground, so that the impact as indicated by an arrow in the figure is transmitted to the inside of the lens barrel 10.

When the barrel is extended as shown in FIG. 8, and any impact in the direction of the fixed member 180a is applied to the tip of the first-group lens unit 110, the impact force is transmitted to the rotational barrel 160a via the unillustrated cam pins of the first-group lens unit 110. The cam grooves 161 engaging with the cam pins are formed generally orthogonal to the optical axis X. Accordingly, if the impact in the direction of the fixed member 180a is applied to the cam pins, a force occurs not only in the direction of the fixed member 180a but also in such a direction as to rotate the rotational barrel 160a.

When the motor of the motor unit 190 is being stopped, if the rotational barrel 160a is forcibly rotated by any impact force, load is imposed on the gear trains in the motor unit 190, including meshing portions of the gear 165 and the drive gear 191 (see FIG. 5). For example, the load deforms the gears and changes the center-to-center distance therebetween, so that the drive force of the motor unit 190 might not be transmitted, or abnormal noise might occur when the gears are rotating.

In the present embodiment, when any impact in the direction of the fixed member 180a is applied to the tip of the first-group lens unit 110 as in the case where the camera 1 is dropped carelessly, the rotational barrel 160a moves toward the fixed member 180a in defiance of the biasing force of the wave spring 170, so that the first engagement portion 166 engages with the second engagement portions 184, thereby locking rotation of the rotational barrel 160a.

The first engagement portion 166, which is generally ring-shaped, is provided on the fixed member 180a side end of the rotational barrel 160a, as shown in FIG. 4. The first engagement portion 166 is shaped to have periodically-repeated projections. These projections may be formed with triangular tips, for example.

The three second engagement portions 184 are each provided in the form of an arc in a flat portion of the fixed member 180a, as shown in FIG. 3, and positioned to face the first engagement portion 166 provided on the rotational barrel 160a. The second engagement portions 184 are shaped in a manner similar to the first engagement portion 166. That is, each second engagement portion 184 has projections periodically repeated with the same pitches as those of the first engagement portion 166. Therefore, the second engagement portions 184 can engage with the first engagement portion 166. The projections of the second engagement portions 184 may be formed with triangular tips, for example.

Normally, the wave spring 170 biases the rotational barrel 160a in such a direction as to space it apart from the fixed member 180a, as shown in FIGS. 8 and 9. Accordingly, the rotational barrel 160a and the fixed member 180a are held at a given distance from each other. In such a state, the first engagement portion 166 and the second engagement portions 184 do not engage with each other, and therefore the rotational barrel 160a can be rotated by the motor unit 190.

When any impact is applied to the lens barrel 10, impact force components directed in the direction of the optical axis X are applied to the rotational barrel 160a, so that the rotational barrel 160a moves toward the fixed member 180a in defiance of the biasing force of the wave spring 170, as shown in FIGS. 10 and 11. As a result, the wave spring 170 is deflected so that the first engagement portion 166 and the second engagement portions 184 engage with each other.

Specifically, the space between the rotational barrel 160a and the fixed member 180a is eliminated so that the first engagement portion 166 and the second engagement portions 184 mesh with each other, as shown in FIG. 11. In particular, the projections of the first engagement portion 166 are formed so as to extend almost around the entire circumference of the first engagement portion 166, and therefore, whatever rotational position the rotational barrel 160a is in, the first engagement portion 166 and the second engagement portions 184 always mesh with each other. As a result, rotation of the rotational barrel 160a is locked, thereby making it possible to prevent any drive transmission portion, such as the motor unit 190, from being damaged.

Note that when the impact force vanishes, the biasing force of the wave spring 170 spaces the first and second engagement portions 166 and 184 apart from each other again, thereby allowing the rotational barrel 160a to return to a rotatable state.

As described above, the first and second engagement portions 166 and 184 are normally spaced apart from each other by the biasing force of the wave spring 170, and therefore the rotational barrel 160a is not hindered from rotating. On the other hand, when any impact is applied to the lens barrel 10, the wave spring 170 is deflected so that the first and second engagement portions 166 and 184 engage with each other, which locks rotation of the rotational barrel 160a, thereby making it possible to prevent, for example, deformation of the gears and any change in the center-to-center distance therebetween.

In the present embodiment, the first engagement portion 166 is integrally formed with the gear 163 when producing the rotational barrel 160a by resin molding. The first engagement portion 166 may be provided independently of the rotational barrel 160a, and attached to the rotational barrel 160a via an adhesive, but by integrally forming the first engagement portion 166 with the rotational barrel 160a, it becomes possible to minimize the number of components to be used.

Similarly, the second engagement portions 184 are integrally formed with the fixed member 180a when producing the fixed member 180a by resin molding. Also, the second engagement portions 184 may be provided independently of the fixed member 180a, and attached to the fixed member 180a via an adhesive, but by integrally forming the second engagement portions 184 with the fixed member 180a, it becomes possible to minimize the number of components to be used.

Note that as shown in FIG. 4, the first engagement portion 166 is provided in the form of a ring with notched portions, which are used as gates during resin molding, but it is preferable that the first engagement portion 166 be provided in the form of a complete ring. In addition, while the three second engagement portions 184 are each provided in the form of an arc in the flat portion of the fixed member 180a, as shown in FIG. 3, the number of second engagement portions is not particularly restrictive.

Also, in the present embodiment, the wave spring 170 is used as a means for spacing the rotational barrel 160a apart from the fixed member 180a, but a coil spring roughly the same diameter as the rotational barrel 160a may be used. However, such a coil spring has an increased contact area with the rotational barrel 160a and the fixed member 180a compared to the wave spring, and therefore use of the coil spring is limited to the case where the frictional force does not hinder the rotational barrel 160a from rotating.

Second Embodiment

Figure 12:
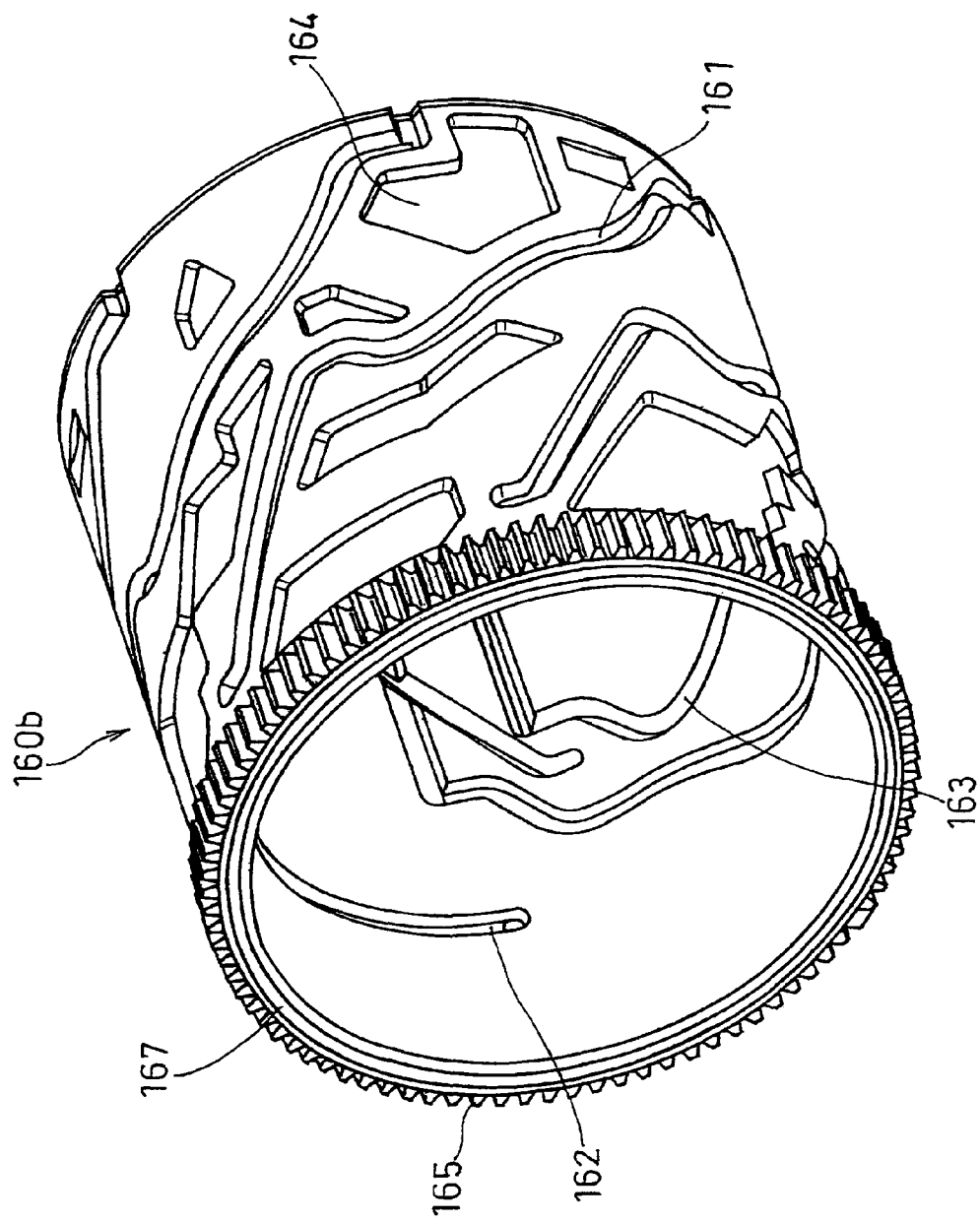
FIG. 12 is a perspective view of a rotational barrel 160b included in a lens barrel according to a second embodiment of the present invention.
Figure 13:
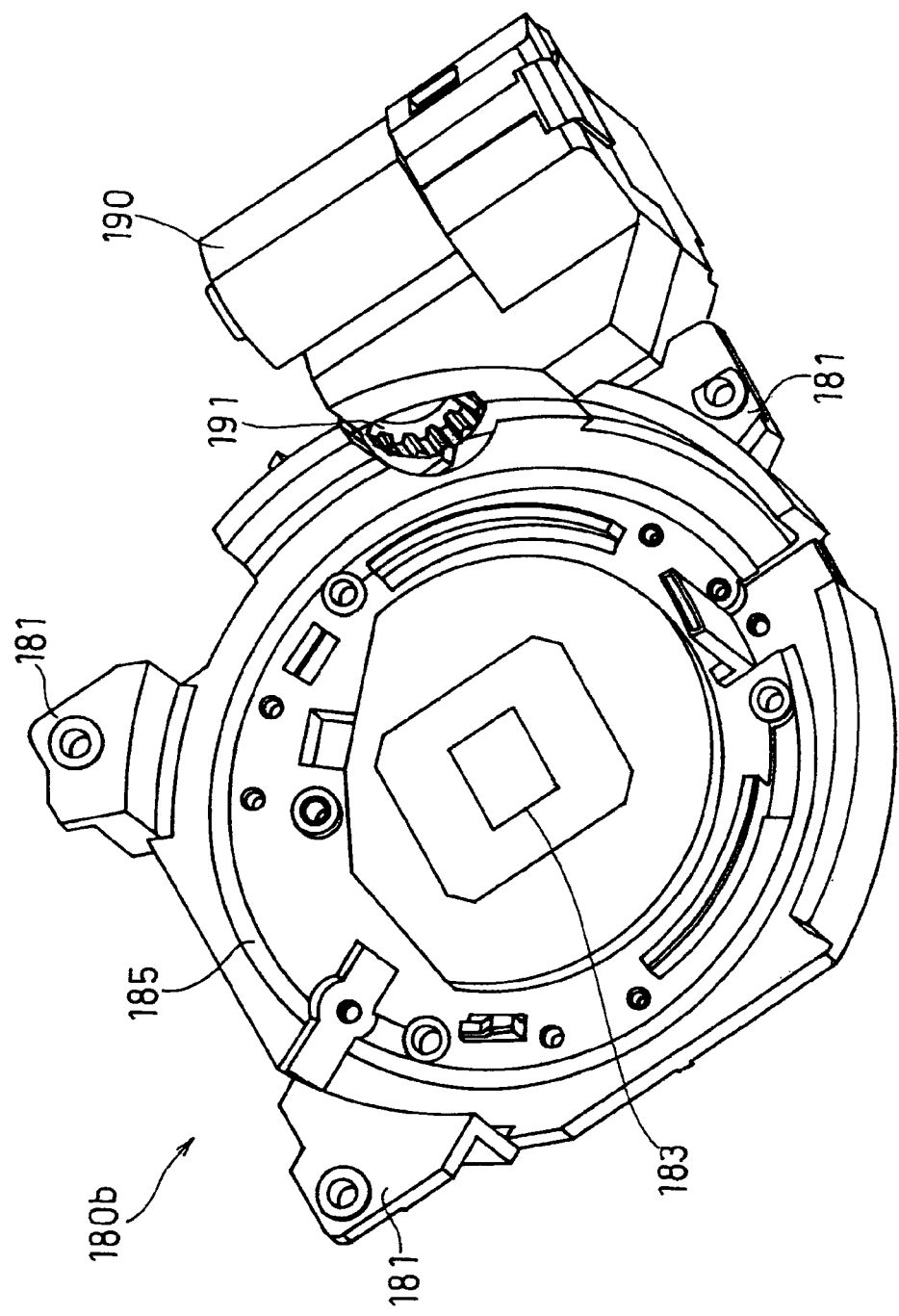
FIG. 13 is a perspective view of a fixed member 180b included in the lens barrel according to the second embodiment of the present invention.

FIG. 12 illustrates the configuration of a rotational barrel of a lens barrel according to a second embodiment of the present invention. FIG. 13 illustrates the configuration of a fixed member according to the second embodiment of the present invention. In the present embodiment, the lens barrel includes a rotational barrel 160b and a fixed member 180b, in place of the rotational barrel 160a and the fixed member 180a, respectively, in the first embodiment. Note that other elements are the same as those of the lens barrel in the first embodiment.

In the lens barrel according to the first embodiment, the first engagement portion 166 provided at the end of the rotational barrel 160a engages with the second engagement portions 184 provided on the fixed member 180a, thereby inhibiting rotation of the rotational barrel 160a when any impact is applied to the lens barrel. On the other hand, the lens barrel according to the present embodiment has a frictional portion 167 provided at the end of a rotational barrel 160b, and the frictional portion 167 is brought into contact with a flat portion 185 provided in the fixed member 180b, thereby generating a frictional force therebetween to inhibit rotation of the rotational barrel 160b.

Specifically, in the present embodiment, the frictional portion 167 secured at the end of the rotational barrel 160b, as shown in FIG. 12, is made up of a material with a high frictional coefficient and has a ring-like shape with a rectangular cross-section. The frictional portion 167 is preferably made up of a material, such as silicon rubber or polyurethane, which has a high frictional coefficient and durability. On the other hand, as shown in FIG. 13, the flat portion 185 provided in the fixed member 180b is generally ring-shaped and disposed to face the frictional portion 167. Note that the frictional portion 167 and the flat portion 185 are examples of first and second contact portions, respectively, of the present invention.

Note that the rotational barrel 160b and the fixed member 180b are configured in the same manner as the rotational barrel 160a and the fixed member 180a, respectively, in the first embodiment, except for the points as described above. Although omitted in FIG. 12, the wave spring 170 is disposed so as to surround the ring-shaped frictional portion 167, as in the case of the lens barrel in the first embodiment.

The functions of the frictional portion 167 and the flat portion 185 will be described below with reference to FIGS. 8 to 11, assuming that the first engagement portion 166 and the second engagement portions 184 in the figures are respectively replaced with the frictional portion 167 and the flat portion 185. When any impact in the direction of the fixed member 180b is applied to the lens barrel 10, the wave spring 170 is deflected so that the rotational barrel 160b is pressed upon the fixed member 180b. This impact force generates a frictional force between the frictional portion 167 secured on the rotational barrel 160b and the flat portion 185 of the fixed member 180a, thereby locking rotation of the rotational barrel 160b.

As described above, in the first embodiment, the first engagement portion 166 having periodically-repeated projections is provided on the rotational barrel 160a, and similarly, the second engagement portions 184 having periodically-repeated projections are provided on the fixed member 180a. Therefore, molds with complicated shapes are required to produce the rotational barrel 160a and the fixed member 180a, which increases production cost of the lens barrel 10. On the other hand, the present embodiment merely requires the ring-shaped frictional portion 167 to be attached at the end of the rotational barrel 160b via an adhesive, and the flat portion 185 to be formed in the fixed member 180b, and therefore the lens barrel 10b can be advantageously produced at low cost.

While a ring-shaped member is used as the frictional portion 167 in the present embodiment, the ring may be partially notched. In addition, the flat portion 185 is merely required to have such a flatness as to generate a sufficient frictional force against the frictional portion 167 when the frictional portion 167 is brought into close contact therewith, and the flatness does not have to be enhanced by specialized processing. For similar reasons, the flat portion 185 does not always have to be completely flat, so long as the frictional force sufficient to lock rotation of the rotational barrel 160b is generated between the frictional portion 167 and the flat portion 185.

Although the present embodiment includes the ring-shaped frictional portion 167 secured on the rotational barrel 160b, and the flat portion 185 formed in the fixed member 180b, similar effects can be achieved by securing a ring-shaped frictional portion onto the fixed member 180b, and providing a flat portion in the rotational barrel 160b.

The present invention is widely applicable to imaging devices, such as digital still cameras and video movie cameras, which include the collapsible lens barrel.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lens barrel mounted on/detachable from an imaging device body, the lens barrel comprising:
    a lens;
    a rotational barrel including a first contact portion and rotatable about an optical axis of the lens with respect to the imaging device body;
    a fixed member including a second contact portion and unrotatable about the optical axis of the lens with respect to the imaging device body; and
    an elastic member disposed between the rotational barrel and the fixed member for biasing the rotational barrel and the fixed member in such directions as to space apart the rotational barrel and the fixed member from each other, wherein
    the first contact portion and the second contact portion are configured to, when brought into contact with each other, lock rotation of the rotational barrel about the optical axis with respect to the imaging device body.

2. The lens barrel according to claim 1, wherein the elastic member is a ring-shaped flat spring.

3. The lens barrel according to claim 1, wherein,
    the first contact portion is a first engagement portion provided at an imaging device body-side end of the rotational barrel,
    the second contact portion is a second engagement portion provided on a subject side of the fixed member, and
    the first engagement portion and the second engagement portion engage with each other to lock the rotation of the rotational barrel.

4. The lens barrel according to claim 3, wherein the first engagement portion is disposed in a ring-like shape or an approximate ring-like shape along the imaging device body-side end of the rotational barrel.

5. The lens barrel according to claim 3, wherein the first engagement portion is shaped to have projections, and the second engagement portion is shaped to have projections so as to be engageable with the first engagement portion.

6. The lens barrel according to claim 3, wherein the first engagement portion is shaped to have periodically-repeated projections, and the second engagement portion is shaped to have periodically-repeated projections so as to be engageable with the first engagement portion.

7. The lens barrel according to claim 3, wherein the first engagement portion is integrally formed with the rotational barrel, and the second engagement portion is integrally formed with the fixed member.

8. The lens barrel according to claim 1, wherein,
the first contact portion is a frictional portion provided at an imaging device body-side end of the rotational barrel,
the second contact portion is a flat portion provided on a subject side of the fixed member, and
the rotation of the rotational barrel is locked via a frictional force generated between the frictional portion and the flat portion.

9. The lens barrel according to claim 8, wherein the frictional portion is disposed in a ring-like shape or an approximate ring-like shape along the imaging device body-side end of the rotational barrel.

10. The lens barrel according to claim 1, wherein the fixed member is integrally formed with the imaging device body.

11. The lens barrel according to claim 1, further comprising a cylindrical fixed barrel disposed within a cylindrical portion of the rotational barrel and secured to the fixed member with its axial center approximately coinciding with the optical axis of the lens.

12. The lens barrel according to claim 1, further comprising a cylindrical lens holding frame for holding the lens, the lens holding frame having a cam pin attached to the cylindrical portion, wherein,
the cam pin engages with a cam groove formed in an outer circumferential surface of the rotational barrel.

13. An imaging device comprising:
an imaging device body; and
a lens barrel mounted on/detachable from the imaging device body, wherein:
the lens barrel includes:
a lens;
a rotational barrel including a first contact portion and rotatable about an optical axis of the lens with respect to the imaging device body;
a fixed member including a second contact portion and unrotatable about the optical axis of the lens with respect to the imaging device body; and
an elastic member disposed between the rotational barrel and the fixed member for biasing the rotational barrel and the fixed member in such directions as to space apart the rotational barrel and the fixed member from each other, and
the first contact portion and the second contact portion are configured to, when brought into contact with each other, lock rotation of the rotational barrel about the optical axis with respect to the imaging device body.

14. The lens barrel according to claim 1, wherein, when the rotational barrel moves toward the fixed member along the optical axis by an external impact applied along the optical axis, in defiance of a biasing force of the elastic member, the first contact portion and the second contact portion are brought into contact with each other, thereby locking rotation of the rotational barrel.

15. The lens barrel according to claim 1, wherein the fixed member is a fixed plate.

16. The imaging device according to claim 13, wherein, when the rotational barrel moves toward the fixed member along the optical axis by an external impact applied along the optical axis, in defiance of a biasing force of the elastic member, the first contact portion and the second contact portion are brought into contact with each other, thereby locking rotation of the rotational barrel.

17. The imaging device according to claim 13, wherein the fixed member is a fixed plate.

* * * * *